(12) United States Patent
Mayer (10) Patent No.: US 10,011,249 B2
(45) Date of Patent: Jul. 3, 2018

(54) WINDSHIELD WIPER SYSTEM WITH TWO OPPOSITE WIPERS AND TWO REVERSING MOTORS

(75) Inventor: Stephan Mayer, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 1203 days.

(21) Appl. No.: 11/815,337

(22) PCT Filed: Jan. 24, 2006

(86) PCT No.: PCT/EP2006/050392
§ 371 (c)(1),
(2), (4) Date: Aug. 2, 2007

(87) PCT Pub. No.: WO2006/100136
PCT Pub. Date: Sep. 28, 2006

(65) Prior Publication Data
US 2009/0119864 A1    May 14, 2009

(30) Foreign Application Priority Data

Mar. 24, 2005  (DE) .................. 10 2005 013 591

(51) Int. Cl.
*B60S 1/08*  (2006.01)
*B60S 1/28*  (2006.01)
*B60S 1/18*  (2006.01)
*B60S 1/24*  (2006.01)

(52) U.S. Cl.
CPC ............. *B60S 1/0814* (2013.01); *B60S 1/185* (2013.01); *B60S 1/245* (2013.01)

(58) Field of Classification Search
CPC ............. B60S 1/0818; B60S 1/08; B60S 1/24

USPC ................................ 15/250.14; 318/102, 41
See application file for complete search history.

(56) References Cited

U.S. PATENT DOCUMENTS

| | | | | |
|---|---|---|---|---|
| 4,431,954 A | * | 2/1984 | Carpenter et al. | 318/443 |
| 4,723,101 A | * | 2/1988 | Bauer et al. | 318/443 |
| 4,900,995 A | * | 2/1990 | Wainwright | B60S 1/0814 318/102 |
| 5,182,501 A | * | 1/1993 | Henderson et al. | 318/443 |

(Continued)

FOREIGN PATENT DOCUMENTS

| | | |
|---|---|---|
| DE | 1405997 | 11/1968 |
| DE | 1455969 | 2/1969 |
| DE | 3644428 A1 | 7/1988 |

(Continued)

OTHER PUBLICATIONS

International Search Report for PCT/EP2006/050392, completed Mar. 14, 2006.

*Primary Examiner* — Christopher M Koehler
*Assistant Examiner* — Stephanie Berry
(74) *Attorney, Agent, or Firm* — Michael Best & Friedrich LLP (57) ABSTRACT

In the case of a windshield wiper system with two opposite wipers 1, 2, 4, 5 and two reversing motors 6, 7, the risk of a collision of the wipers can be diminished greatly in that a defined phase displacement is generated between the wiping movements of the two wipers, which are driven in a reversing manner, with the aid of the lever mechanism 8 associated with the reversing motors, and said phase displacement is arranged so that the one wiper is leading relative to the other wiper in the first wiping direction and lagging in the second wiping direction.

19 Claims, 4 Drawing Sheets

(56) References Cited

U.S. PATENT DOCUMENTS 6,107,766 A * 8/2000 Amagasa .................. B60S 1/08
                                                   318/41
6,281,649 B1    8/2001 Ouellette et al.

FOREIGN PATENT DOCUMENTS

| DE | 10045573 | A1 | 4/2002 |
| DE | 10306496 | A1 | 8/2004 |
| DE | 69937979 | T2 | 1/2009 |
| EP | 0855317  | A1 | 7/1998 |
| FR | 2918023  | A1 | 1/2009 |

* cited by examiner

Fig. 1

Fig. 5    MCA = Motor crank angle (°)

Fig. 6    MCA

Fig. 7  MCA

Fig. 8  MCA

WINDSHIELD WIPER SYSTEM WITH TWO OPPOSITE WIPERS AND TWO REVERSING MOTORS

BACKGROUND OF THE INVENTION

The invention relates to a windshield wiper system with two opposite wipers and two synchronized reversing motors wherein the wipers overlap at least partially with their wiper blades in a parked position and wherein each reversing motor is driven via an associated lever mechanism of a wiper.

This type of wiper system is known from DE 103 06 496 A1, for example.

Different wiper field types and drive devices are known in order to clean windshields of motor vehicles. In the case of wiper fields, a differentiation is made mainly between single-lever wiper fields and dual-lever wiper fields. In the case of the dual-lever wiper fields, the wiper levers comprised of a wiper arm and a wiper blade can be driven in the same direction or in the opposite direction.

As a rule, till now the drive device has only one wiper motor even for two windshield wipers and the rotating drive movement of its output shaft is translated via a crank mechanism into an oscillating rotating movement of the drive shafts of the windshield wipers. Newer wiper motors are equipped with electronics, which regulate a reversing drive movement of the output shaft. In addition, the electronics make possible wiping angle control with a dynamic, load-dependent wiping angle correction and wiper speed regulation. In addition, the electronics permit various wiper functions and positions, i.e., an expanded parking position.

Wiper systems with opposite windshield wipers are frequently used to wipe large windshields. If these are driven by one wiper motor, the result is a great need for construction space in the center of the vehicle along with a large construction size corresponding to the vehicle width. Besides this, the kinematic structure with or without intermediate bearings is expensive and requires a large, powerful wiper motor. The many individual mechanical components give rise to large static wiping angle tolerances, to which dynamic wiping angle tolerances are added, which are caused by the elasticities of the mechanical components as well as the supporting and fastening elements.

In order to achieve a simpler kinematic structure and thereby lower wiping angle tolerances, wiper systems with two wiper motors are used, which are arranged in the area of the wiper bearings and therefore do not occupy any construction space in the center area of the windshield. Two synchronized wiper motors with electrical communication are used to drive the wipers. The two wiper motors are preferably regulated by control electronics in reversing operation in order to achieve the advantages associated therewith. In the process, when the wiper has reached the upper reversal position on the window, a reversing signal to reverse the direction of rotation is generated by the electronics and is fed to the respective motor. As for the rest, the wiper drive, as described in DE 100 45 573 A1 for example, is comprised of a motor crank placed on the output shaft of the respective motor, and the motor crank drives a rocker arm in a pendulum fashion via a lever mechanism, which rocker arm is in turn suitable for driving a wiper arm or a wiper arm linkage. This arrangement is used for rotary and reversing motors, wherein the lever mechanism must be adapted to the drive type.

In actuality, dual-motor opposite-direction wiper systems are being used more and more frequently in vehicles with opposite-direction wiper systems because of installation conditions and motor torque requirements. In the case of these opposite-direction wiper systems, because of the overlapping arrangement of the wiper levers, the wiper levers can collide and get blocked on the vehicle when the wiping movements of the two wiper levers deviate from the target movement. The deviations of the control curves of the wiping movements from the theoretical target curve are caused by mechanical manufacturing tolerances and regulator deviations of the electrically controlled wiper system drive modules. Even with ideally synchronized motor output shafts, deviations, which express themselves as randomly distributed mechanical phase displacements between the wiping movements of the wipers, can occur because of the downstream mechanics.

If the total of the phase displacements of the wiping movements between the driver's side and passenger side modules of a dual-motor wiper system turn out to be unfavorable, this produces a collision when there is an insufficient minimum distance between the wiper levers. However, the greater safety distance of the wiper blades from one another that is required because of the tolerance-encumbered control curves goes hand in hand with the disadvantage of less harmonic wiper operation.

The object of the invention is designing a windshield wiper system of the type cited at the outset in such a way that the risk of collision of the wipers that is caused by the manufacturing and electronic tolerances can be reduced without having to increase the safety distance of the wiper lovers.

SUMMARY OF THE INVENTION

According to the invention, a defined phase displacement is generated between the wiping movements of the two wipers that are driven in reversing manner via the lever mechanism associated with the reversing motors, which is arranged so that the one wiper is leading—relative to the other wiper—in the first wiping direction and lagging in the second wiping direction. The invention is based on the idea that a mechanical phase displacement in a reversing motor has a completely different effect than in a rotary motor. In the latter case, a leading upper wiper that is leading in the first wiping direction would also lead undesirably in the second wiping direction and this would mean an increased risk of collision. However, in the case of a reversing motor, at the upper reversal point of the respective wiper there is a phase reversal so that the upper wiper that was leading to begin with is automatically lagging in the second wiping direction, whereby the risk of collision is also reduced in the second half of the wiping cycle. As related to the lower wiper, this relationship consequently means that the lower wiper that is lagging in the first wiping direction relative to the upper wiper is leading in the second wiping direction due to the phase reversal taking place at the reversal points. As a whole, the targeted mechanical phase displacement in accordance with the invention particularly in the critical collision range with center wiping angles produces a spreading apart of the course of the wiping movement of the wipers relative to one another that diminishes the risk of collision.

Because of the behavior in accordance with the invention of a defined and targeted phase displacement between driver's side and passenger side wiper systems modules, the risk of a collision of the wipers can be reduced greatly. On the other hand, without risking a collision, in the case of a phase displacement designed in accordance with the invention, the minimum distance of the wiper blades can be kept small or reduced despite tolerances, whereby, in addition to harmonizing the wiper flow advantageously, the wiper system is subject to less stress and the maximum current consumption is reduced. In addition, electronic regulator deviations of the control curve of the wiping movements from the target values can also be anticipated or mitigated with respect to the risk of collision by the phase displacement in accordance with the invention.

In an advantageous manner, the lever mechanism can be used to generate either a positive phase displacement, which is linked with the upper wiper leading in the first wiping direction, only for the upper wiper or, alternatively, a negative phase displacement, which is linked with the lower wiper lagging in first wiping direction, only for the lower wiper.

An especially advantageous embodiment of the windshield wiper system in accordance with the invention provides that a positive phase displacement linked with the leading of the upper wiper in the first wiping direction and a negative phase displacement linked with the lagging of the lower wiper in the first wiping direction are generated simultaneously with the aid of the lever mechanism. As a result, the phase displacement of the respective individual wiper can be kept relatively small. In addition, it is also favorable if the absolute amount of the phase displacement for the upper and lower wipers is a respective motor crank angle of approximately 3°.

In a further advantageous variation, the phase displacement is generated by a defined angle deviation of the respective motor crank of the lever mechanism. This variation can be embodied in an especially advantageous manner in that the motor crank is connected in an articulated manner with an articulation rod, which is connected with its other end in an articulated manner with a bearing rocker arm that drives the respective wiper in a pendulum fashion, and that the angle deviation is generated by the deviation of the motor crank from the ideal coverage position or extended position with respect to the articulation rod. The transmission function (gear function) of these types of gears with a non-uniform gear transmission ratio offers the advantage that adequate phase displacements of several degrees for reducing the risk of collision are realized by anticipating a corresponding motor crank angle, only with very small changes in the wiping angle of the respective wiper that are hardly perceptible to the driver.

Although the phase displacement anticipated in accordance with the invention gives rise to a deviation of the wiping angle from the nominal wiping angle in the upper reversal position, however, this can be corrected in a simple manner in that the reversing angle of the respective wiper that deviates from the target reversing angle because of the phase displacement is corrected via a recalibration of the electric control of the respective reversing motor in such a way that it results in the nominal wiping angle for the wiper in the upper reversal position.

Also advantageous for all variations of the windshield wiper system in accordance with the invention is that the phase displacement is generated in the course of manufacturing during assembly of the respective motor crank, i.e., no expensive structural modifications are required.

In detail, in the case of dual-motor wiper systems with mechanically different modules, which are supplied only in a left-hand drive design or a right-hand drive design (a total of four wiper system modules), the phase displacement is realizable simply by a targeted linkage assembly.

BRIEF DESCRIPTION OF THE DRAWINGS

The invention will be explained in the following on the basis of exemplary embodiments that are based on the drawings. The drawings show.

DETAILED DESCRIPTION

Figure 1:
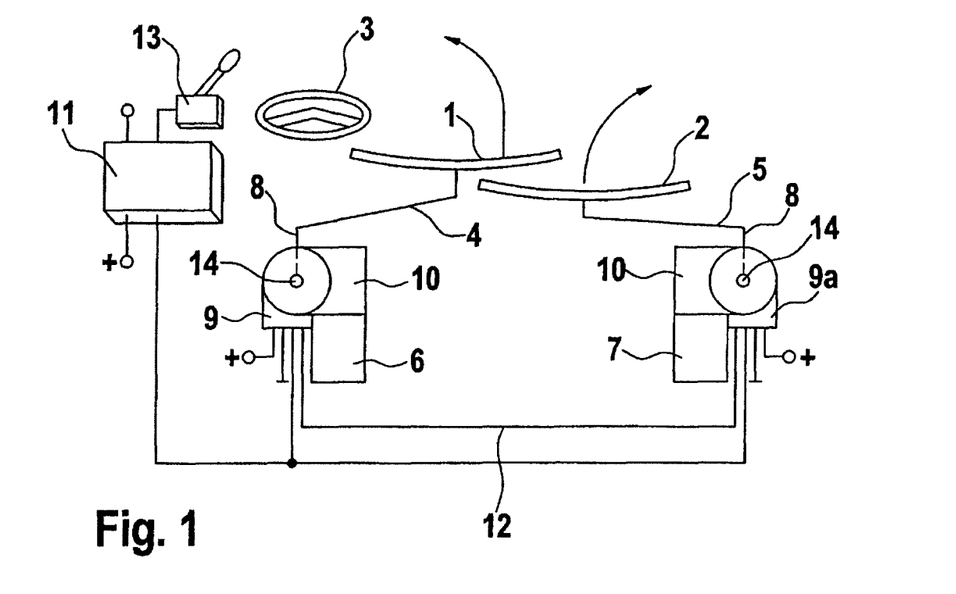
FIG. 1 A schematic representation of a wiper system for vehicle windshields in accordance with the invention FIG. 2 A top view of a linkage provided as a mechanism for the wiper system in accordance with the invention in an arrangement with a motor crank position cranked out by +3° (driver's side (DS) module)

FIG. 1 shows a schematic representation of a preferred embodiment of a windshield wiper system with two opposite wipers. The wiper system has an upper, driver's side wiper (see the steering wheel symbol 3) and a lower, passenger side wiper. The upper wiper has an upper wiper arm 4 and an upper wiper blade 1 and the lower wiper has a lower wiper arm 5 and a lower wiper blade 2. In the depicted parked position, the wiper blades 1 and 2 are over one another, i.e., at least partially overlapping, and arranged more or less parallel in the lower region of the windshield that is to be wiped. In the first half of a wiping cycle—when wiping upwards—the upper wiper blade 1 moves counter-clockwise roughly in a quarter circle, while the opposed lower wiper blade 2 simultaneously (in this case and in the following we are disregarding possible time-related phase displacements of the two wipers, which are generated by the electronic control in accordance with the program or for regulation purposes in contrast to the mechanical phase displacement in accordance with the invention) executes a quarter circle movement clockwise, see the corresponding arrows in FIG. 1. Once the wiper blades 1 and 2 have reached their upper reversal positions, they change their direction of movement, and, after wiping downward, reach their lower reversal position at the end of the wiping cycle. The lower reversal positions can deviate somewhat from the parked position depicted in FIG. 1. In addition, in modern wiper systems a so-called expanded parked position and/or additional functional or service positions can also be provided. Alternatively, there is also the possibility for the wiper blades to be aligned essentially perpendicularly along the A pillar of the vehicle in the parked position so that the first half of the wiping cycle is a downward wiping and the second half of the wiping cycle is an upward wiping.

Because of the opposite, overlapping wiper blades 1 and 2, there is an overlapping of the lower regions of the wiper fields traveled by the wiper blades 1 and 2. As a result, the wipers must be synchronized in operation in such a way that they do not collide with one another. The risk of collision is obviously the greatest in the area of center wiping angles, i.e., approx. in the center between the upper and lower reversal positions. In modern dual-motor wiper systems, synchronization occurs via electronic triggering of the two wiper motors.

Figure 2:
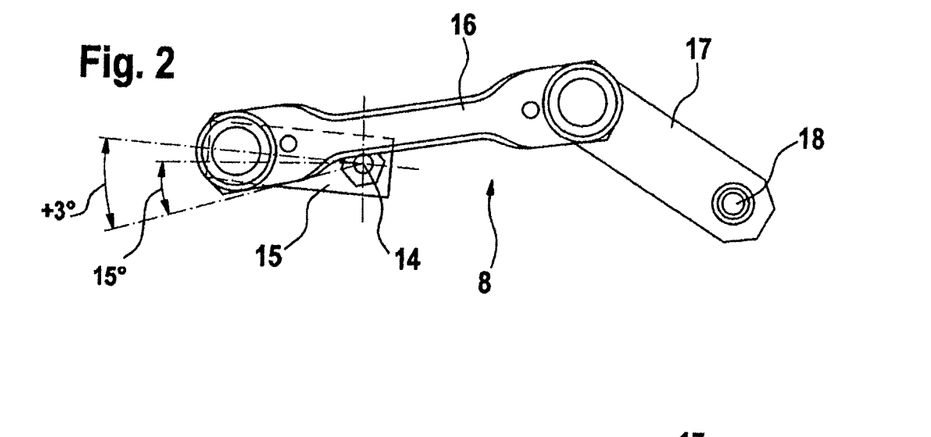

In the case of the dual-motor wiper system shown in FIG. 1, the two wipers are each driven by a wiper module comprised of a reversing motor 6 and 7, a mechanism 8 described in more detail in FIG. 2 and an electronic control 9. (An internal worm gear 10, which drives the output shaft 14, can also be integrated into each of the reversing motors 6 and 7.) The controls of both of the wiper modules are attached jointly to a vehicle control unit 11. In addition, the controls 9 are connected directly to one another via a serial interface 12. The wiper system is operated via a wiper switch 13 attached to a vehicle control unit 11. In the case of a left-hand drive vehicle, as indicated in FIG. 1 by the steering wheel symbol 3, for synchronization purposes, as described in more detail in DE 103 06 496 A1 in accordance with the species, typically the driver's side left wiper module as the master module can be provided with a master control 9, while the passenger side right wiper module is designed as a slave module with a slave control 9a. In this case, the wiping characteristic curve of both windshield wipers are stored in the control 9 of the master module. Once the wiper system is switched on by the wiper switch 13, the master module triggers the upper wiper in accordance with its characteristic curved stored in the control 9. Furthermore, the slave module is triggered by the control 9 of the master module. In doing so, the master module sends position target values to the slave module in a cyclical sequence and the slave module responses with its actual position values via the serial interface 12.

FIG. 2 shows a linkage provided as a mechanism 8 for the driver's side module of the wiper system in accordance with the invention, which is depicted in an arrangement with a motor crank position cranked out by +3°. In this case, on the one hand, the motor crank 15 is rigidly connected to the motor output shaft 14 and, on the other hand, connected in an articulated manner to an articulation rod 16, which is connected with its other and in an articulated manner with a bearing rocker arm 17 that drives the respective wiper in a pendulum fashion. The rocker arm 17 is rigidly connected to the drive shaft 18 for the wiper lever (not shown here in greater detail). For an output shaft 14 driven by a rotary wiper motor, this arrangement forms a mechanism embodied as a so-called crank and rocker linkage. The motor crank 15 rotating around the output shaft 14 leads to the pendulum movement of the bearing rocker arm 17 back and forth by approx. 80° to 90°, i.e., by the wiping angle, wherein the mechanism functions near the coverage position and extended position (the motor crank 15 relative to the articulation rod 16) with essentially lower gear transmission ratio than in the two intermediate motor crank angle regions. The transmission function of the mechanism, which expresses the dependence of the wiping angle indicated by the movement of the bearing rocker arm 17 on the motor crank angle, thus flattens out greatly at the reversal positions. This also applies in a similar way for a reversing motor used here in accordance with the invention, which receives a reversing signal at the upper reversal position of the wiper, which is also defined if need be at a reversing angle of less than 180° motor crank angle, and reverses its direction of rotation.

Figure 3:
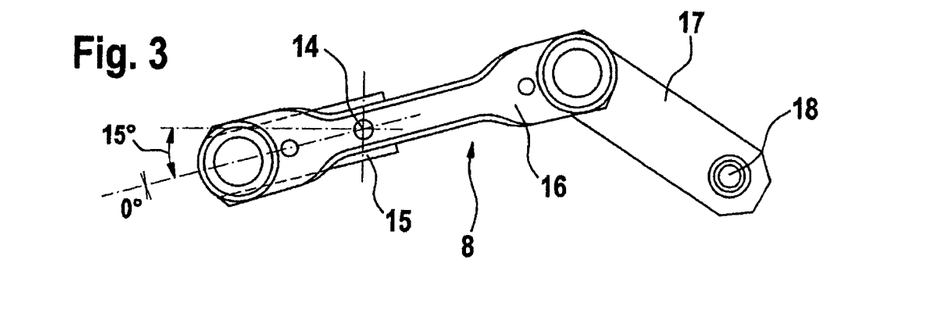
FIG. 3 The linkage according to FIG. 2, however in a coverage position

As FIG. 2 shows, an angle deviation, i.e., a phase displacement, of +3° is generated because of the deviation of the motor crank 15 from the ideal coverage position with respect to the articulation rod 16 that is depicted in FIG. 3. If the motor crank 15 of the driver's side wiper module is mounted in this cranked out position, the upper wiper starts the wiping cycle with a phase jump of +3° motor crank angle as compared to the lower wiper (unless it is itself out-of-phase). In the case of a specific motor crank angle, the reversing angle, the reversal of the direction of rotation and of the phase of the reversing motor occurs so that the downward wiping takes place with a phase displacement of −3° motor crank angle until the next phase reversal takes place at the lower reversal point. The driver's side, upper wiper is therefore leading during the upward wiping and lagging during the downward wiping.

Figure 4:
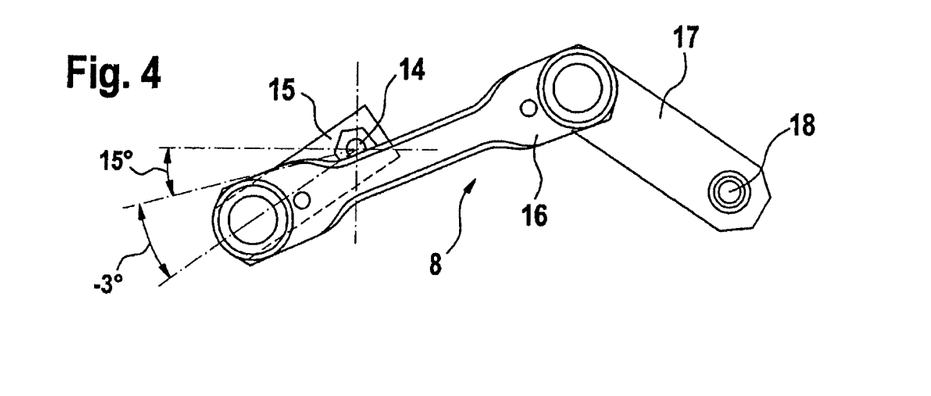
FIG. 4 The linkage according to FIGS. 2 and 3 in an arrangement with a motor crank position cranked out by −3° (passenger side (PS) module)

FIG. 4 depicts the linkage in accordance with FIGS. 2 and 3 with a cranked out motor crank position of −3°. If the motor crank 15 of the passenger side module is mounted in this position, a negative phase displacement of 3° results there, i.e., lagging during upward wiping and, after the phase reversal, leading during downward wiping. If both the driver's side and passenger side modules are mounted "oppositely phased" as depicted in FIGS. 2 and 4, this results in a total phase displacement of the wipers to one another of 6° motor crank angle.

Because of the manufacturing tolerances of the drive modules of a dual-motor wiper system and regulator deviations of the electronically controlled modules from the theoretic target curve of the wiping movements for the master and slave modules, there is, as described at the outset, a risk of the wiper levers colliding when there is an insufficient minimum distance of the wiper levers from each other. In order to compensate for these manufacturing tolerances of the wiper arm, wiper lever, assembly of the wiper levers at the customer and deviation of the electronic control values from the nominal value with the master and slave, till now a relative large and vehicle-specific minimum distance (approx. 90-100 mm) of the wiper levers from one another had to be complied with in order to avoid collisions in all operating states. The large minimum distance required for the wiper blades 1 and 2 now has a less harmonic wiper flow as a disadvantage however, which puts more stress on the wiper arms 4 and 5 and the wiper motor 6 and 7 because of the greater forces of gravity particularly in the reversal positions.

As a result, according to the invention, the phase displacements currently distributed randomly via tolerances to the master (driver's side) and the slave (passenger side) are influenced in such a way that the master module is leading during upwards wiping and lagging during downward wiping. Precisely oppositely phased conditions are implemented for the slave module.

Figure 5:
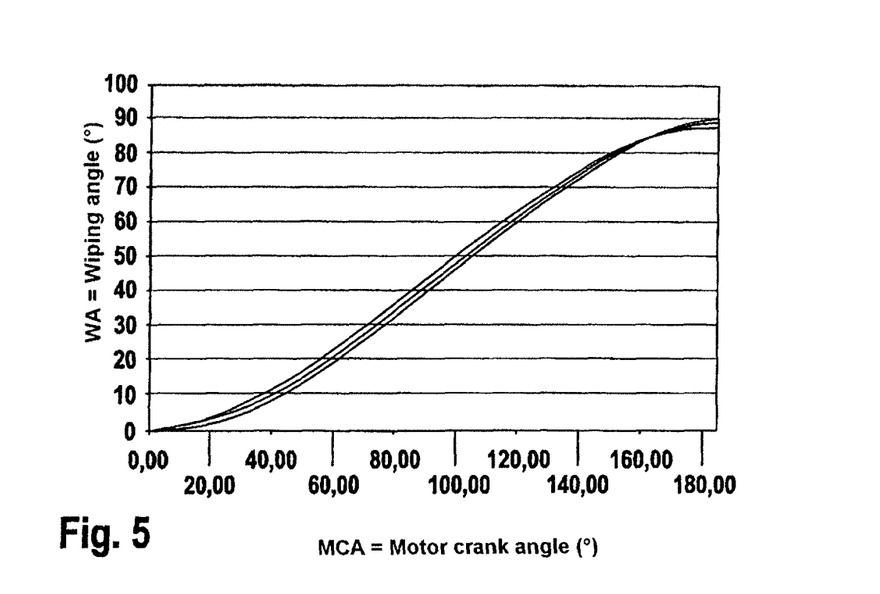
FIG. 5 A diagram with the progression of the possible transmission functions of an individual wiper module that are a function of the linkage tolerances FIG. 6 An enlarged scale of a section of the diagram in accordance with FIG. 5 in the range of small motor crank angles FIG. 7 An enlarged scale of a section of the diagram according to FIG. 5 in the center motor crank angle range that is critical with respect to wiper collisions FIG. 8 An enlarged scale of a section of the diagram according to FIG. 5 in the range of the reversing angle.

FIG. 5 shows the effect of the tolerances of the components/assembly on the transmission function F(MCA)=WA, where MCA is the motor crank angle and WA is the wiping angle. The possible transmission functions of an individual dual-motor wiper module are depicted as a function of the varied linkage tolerances, i.e., the tolerances of the individual components and/or the assembly. The investigation showed that the individual tolerances in the respective most unfavorable cases could add to the upper and/or lower limiting curve. This means, for example, that with a 50° motor crank angle in accordance with the upper limiting curve, a 2-3° wiping angle lead could already be present as compared with the target curve (center curve in FIG. 5), whereby 1° wiping angle is equivalent to approx. 20 mm of the outer circle of the respective wiper blade. Obviously this situation is critical with respect to the risk of collision.

The approach in accordance with the invention of avoiding collisions does not consist for both modules of striving for the closest possible progression of the transmission functions near the target curve since this elimination of the tolerances would require a very precise, expensive balancing of the mechanical and electronic components. It is considerably simpler, as described above, to purposefully generate a leading transmission function for the target curve for the driver's side (upper wiper) and a lagging transmission function for the target curve for the passenger side.

Figure 7:
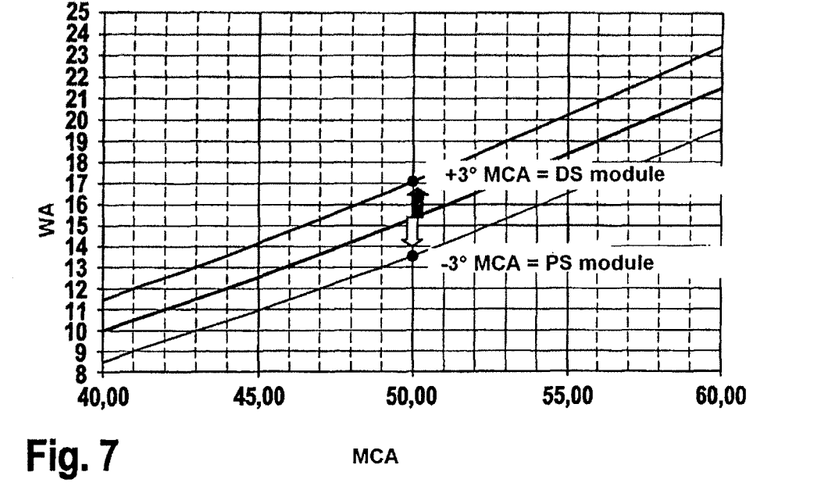

A precise observation of the tolerance-encumbered transmission functions shows that the effect of the component tolerances of the motor crank 15, bearing rocker arm 17 and articulation rod 16 is low in the critical collision range of a 30-80° motor crank angle. The essential influencing variable in this range on the phase displacement is brought about by the assembly deviation of the motor crank 15 from the ideal coverage position and/or extended position, see FIGS. 2 through 4. According to the invention, this intentional and targeted assembly deviation essentially generates a leading and lagging mechanism, as already described in the case of FIGS. 2 through 4 and as schematically depicted again in FIG. 7 in the form of a displacement of the transmission function for the driver's side in the upper limiting curve and for the passenger side in the lower limiting curve. Though the intentional variation of the assembly tolerance of the motor crank 15 is itself again tolerance-encumbered, it changes nothing about the desired effect of the spreading apart of the corresponding upper and lower family of curves.

Figure 6:
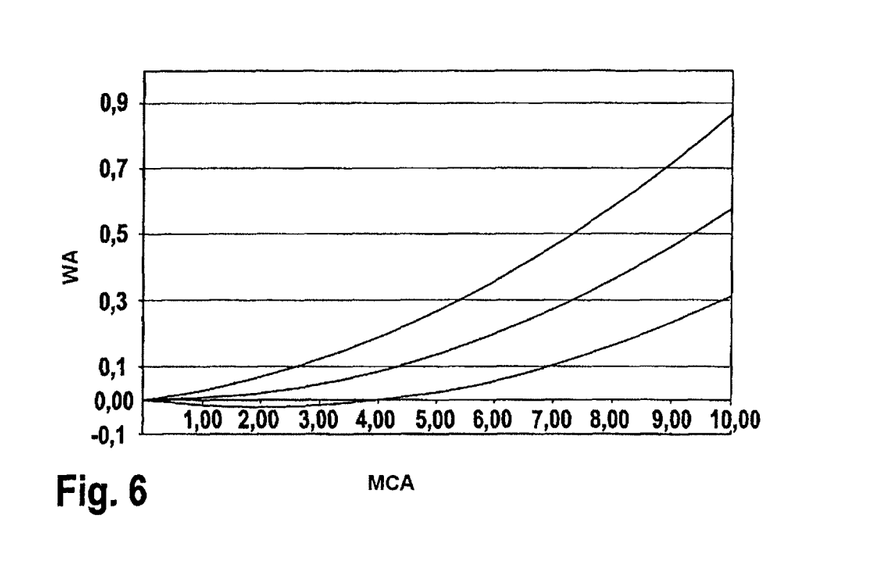

FIG. 6 shows that a linkage, which has a positive (+3°) or negative (−3°) deviation of the assembly of the motor crank 15 from the ideal coverage/extended position, has an effect that cannot be measured on the vehicle on the position of the wiper levers in the parked position since the gear transmission ratio of the mechanism around the coverage/extended position is almost infinite. Movements of the motor crank 15 in this variable range are therefore not perceived by the driver even with wiper systems that are completely mounted on the vehicle since, as FIG. 6 shows, the phase displacements implemented in the limiting curves are linked to only changes of fractions of a degree in the wiping angle.

Figure 8:
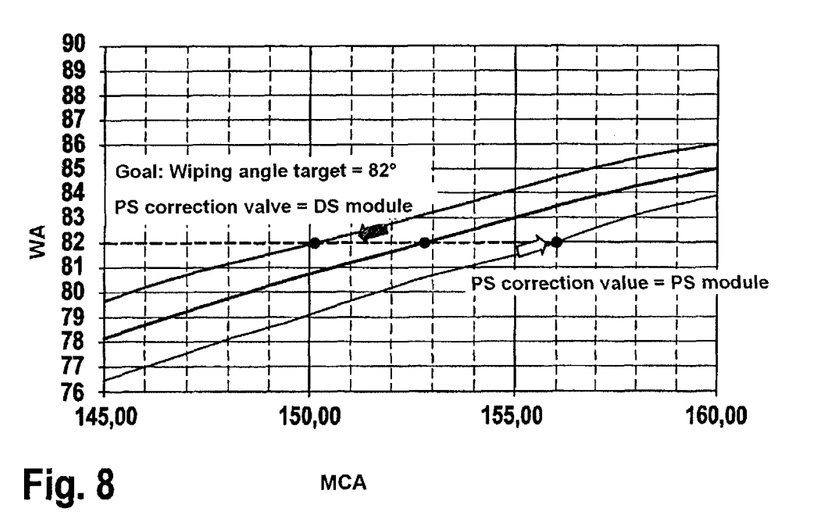

The deviation of the motor crank 15 from the coverage/extended position in the case of reversing drives brings about a deviation of the wiping angle in the upper reversing position. This deviation can, as FIG. 8 depicts, be corrected by a correction of the reversing angle by the intentionally generated phase displacement, e.g., target reversing angle, driver's side (82° wiping angle)=152.8° motor crank angle leads to: target reversing angle, driver's side+phase (82° wiping angle)=150.0° motor crank angle.

This can be performed in a simple manner via a one-time electronic recalibration at the end of the conveyor belt.

The invention claimed is:

1. A windshield wiper system comprising:
   a first wiper including a first wiper blade (1);
   a second wiper including a second wiper blade (2), wherein the first and second wiper blades (1, 2) at least partially overlap in a parked position, and wherein the wipers are arranged so that the first wiper is leading relative to the second wiper in a first wiping direction of a wiping cycle and lagging in a second wiping direction of the wiping cycle;
   a first synchronized reversing motor (6) including a first drive shaft (14);
   a second synchronized reversing motor (7) including a second drive shaft (14);
   a first lever mechanism (8) connected between the first synchronized reversing motor (6) and the first wiper, wherein the first lever mechanism (8) includes a first motor crank (15) rotatably fixed to the first drive shaft (14) such that the first motor crank (15) rotates with the first drive shaft (14), and wherein a first rotation angle is defined between a position of the first motor crank (15) at a given time relative to a first ideal coverage position of the first motor crank (15); and
   a second lever mechanism (8) connected between the second synchronized reversing motor (7) and the second wiper, wherein the second lever mechanism (8) includes a second motor crank (15) rotatably fixed to the second drive shaft (14) such that the second motor crank (15) rotates with the second drive shaft (14), and wherein a second rotation angle is defined between a position of the second motor crank (15) at a given time relative to a second ideal coverage position of the second motor crank (15),
   wherein the first rotation angle and the second rotation angle are not the same such that there is an angle deviation between the first rotation angle and the second rotation angle, and
   wherein the angle deviation remains unchanged through the wiping cycle.

2. The windshield wiper system according to claim 1, characterized in that the angle deviation is a positive phase displacement generated for the first wiper by adjustment of the first lever mechanism (8).

3. The windshield wiper system according to claim 1, characterized in that the angle deviation is a negative phase displacement generated for the second wiper by adjustment of the second lever mechanism (8).

4. The windshield wiper system according to claim 1, characterized in that the angle deviation is a positive phase displacement for the first wiper and a negative phase displacement for the second wiper respectively generated simultaneously by adjustment of the first lever mechanism (8) and the second lever mechanism (8).

5. The windshield wiper system according to claim 1, characterized in that the absolute amount of the angle deviation of each wiper is approximately 3°.

6. The windshield wiper system according to claim 1, characterized in that the first motor crank (15) and the second motor crank (15) are respectively connected in an articulated manner with a first articulation rod (16) and a second articulation rod (16), which are respectively connected in an articulated manner with a first bearing rocker arm (17) and a second bearing rocker arm (17), which respectively drive the first wiper and the second wiper in a pendulum fashion, and that the angle deviation is generated by a deviation of at least one of the first motor crank (15) and the second motor crank (15).

7. The windshield wiper system according to claim 1, characterized in that the angle deviation is generated in the course of manufacturing during assembly of at least one of the first motor crank (15) and the second motor crank (15).

8. The windshield wiper system according to claim 1, characterized in that a reversing angle of the respective wiper deviating from a target reversing angle because of the angle deviation is corrected via a recalibration of an electric control (9, 9*a*) of the respective first and second reversing motor (6, 7) in such a way that it results in a nominal wiping angle for the wiper in the upper reversal position.

9. The windshield wiper system according to claim 1, characterized in that the absolute amount of the angle deviation of each wiper is approximately 3°.

10. The windshield wiper system according to claim 3, characterized in that the absolute amount of the angle deviation of each wiper is approximately 3°.

11. The windshield wiper system according to claim 4, characterized in that the absolute amount of the angle deviation of each wiper is approximately 3°.

12. The windshield wiper system according to claim 1, wherein each of the first lever mechanism (8) and the second lever mechanism (8) includes an articulation rod (16), and each of the first motor crank (15) and the second motor crank is connected in an articulated manner with an associated articulation rod (16), the angle deviation being generated by a deviation of at least one of the first motor crank (15) and the second motor crank (15).

13. A method for operating a windshield wiper system, the windshield wiper system including a first wiper having a first wiper blade (1), a second wiper having a second wiper blade (2), wherein the first and second wiper blades (1, 2) at least partially overlap in a parked position, a first synchronized reversing motor (6) having a first drive shaft (14), a second synchronized reversing motor (7) having a second drive shaft (14), a first lever mechanism (8) connected between the first synchronized reversing motor (6) and the first wiper, wherein the first lever mechanism (7) includes a first motor crank (15); and a second lever mechanism (8) connected between the second synchronized reversing motor (7) and the second wiper, wherein the second lever mechanism (8) includes a second motor crank (15), the method comprising:

rotatably fixing the first motor crank (15) to the first drive shaft (14) such that the first motor crank (15) rotates with the first drive shaft (14), wherein a first rotation angle is defined between a position of the first motor crank (15) at a given time relative to a first ideal coverage position of the first motor crank (15), rotatably fixing the second motor crank (15) to the second drive shaft (14) such that the second motor crank (15) rotates with the second drive shaft (14), wherein a second rotation angle is defined between a position of the second motor crank (15) at a given time relative to a second ideal coverage position of the second motor crank (15), and wherein the first rotation angle and the second rotation angle are not the same such that there is an angle deviation between the first rotation angle and the second rotation angle, and operating the first and second synchronized reversing motors (6, 7) to drive the wipers through a wiping cycle such that the first wiper leads relative to the second wiper in a first wiping direction and lags relative to the second wiper in a second wiping direction, and such that the angle deviation remains unchanged through the wiping cycle.

14. The method of claim 13, wherein each of the first lever mechanism (8) and the second lever mechanism (8) includes an articulation rod (16), and wherein the method further includes connecting each of the first motor crank (15) and the second motor crank (15) in an articulated manner with an associated articulation rod (16), the angle deviation being generated by a deviation of at least one of the first motor crank (15) and the second motor crank (15).

15. The method of claim 14, wherein the absolute amount of the angle deviation of each wiper is approximately 3°.

16. The method of claim 13, wherein the angle deviation is a positive phase displacement generated for the first wiper by adjustment of the first lever mechanism (8).

17. The method of claim 13, wherein the angle deviation is a negative phase displacement generated for the second wiper by adjustment of the second lever mechanism (8).

18. The method of claim 13, wherein the angle deviation is a positive phase displacement for the first wiper and a negative phase displacement for the second wiper respectively generated simultaneously by adjustment of the first lever mechanism (8) and the second lever mechanism (8).

19. The method of claim 13, wherein the absolute amount of the angle deviation of each wiper is approximately 3°.

* * * * *